United States Patent [19]

Iizuka

[11] 3,762,010
[45] Oct. 2, 1973

[54] PISTON RING AND MANUFACTURE THEREOF
[75] Inventor: Kouichi Iizuka, Kamio-City, Japan
[73] Assignee: Nippon Piston Ring Kabushiki Kaisha, Tokyo, Japan
[22] Filed: Feb. 7, 1972
[21] Appl. No.: 223,886

Related U.S. Application Data
[62] Division of Ser. No. 62,347, Aug. 10, 1970, Pat. No. 3,661,402.

[30] Foreign Application Priority Data
Aug. 15, 1969 Japan.............................. 44/64209

[52] U.S. Cl............................. 29/156.6, 29/156.63
[51] Int. Cl............................................. B23p 15/06
[58] Field of Search..................... 29/156.6, 156.63; 277/235 R, 235 A, 236, 223

[56] References Cited
UNITED STATES PATENTS
3,595,590   7/1971   Beyer................................ 277/235 A
3,671,047   6/1972   Umezawa......................... 29/156.63
3,615,099  10/1971   Prasse.............................. 277/235 A Primary Examiner—Charles W. Lanham
Assistant Examiner—Daniel C. Crane
Attorney—Hans Berman

[57] ABSTRACT
A piston ring with a highly wear-resistant sliding surface of tungsten-cobalt electrodeposit and a sliding ring of a sintered mixture of iron oxide and carbon powder.

3 Claims, 3 Drawing Figures

PISTON RING AND MANUFACTURE THEREOF

This is a division of application Ser. No. 62,347, filed on Aug. 10, 1970, and now U.S. Pat. No. 3,661,402.

The present invention relates to an improved piston ring and a method of manufacturing the same.

In modern internal combustion engines operating at high speed subjecting their piston rings to high loads, there has been an increasing need for piston rings which can operate under such conditions without undue wear and scuffing. To obtain piston rings having a long operating life under severe conditions, it has been proposed to increase the hardness of the sliding surface of the rings by chromium plating. However, chromium plating has relatively poor lubricating characteristics, causing the piston rings to stick or scuff during extended operation.

In an effort to overcome this disadvantage, it has been proposed heretofore to provide a sliding ring of good lubricating characteristics on such chromium-plated piston rings. For this purpose, an annular groove is provided in the peripheral sliding surface of the piston ring, the groove is filled with a mixture of iron powder (ferriferrous oxide $Fe_3O_4$), carbon powder and a bonding agent thereof, and the mixture is sintered in the groove, generally at a temperature of about 570°C, when the conventional bonding agents, i.e., waterglass or a thermosetting resin, such as polytetrafluoroethylene, are used. Such high sintering temperatures reduce the hardness of the chromium plating and thus reduce its usefulness in providing a wear-resistant sliding surface for the piston ring.

It is a primary object of this invention to overcome this disadvantage and to provide a piston ring with a very hard sliding surface whose hardness is not unduly affected by the high sintering temperatures used in producing the sliding ring in the piston ring.

The above and other objects and advantages are accomplished in accordance with the invention by substituting a tungsten-cobalt electrodeposit on the sliding surface of the piston ring for the conventional chromium plate.

The above and other objects, advantages and features of the present invention will become more apparent from the following detailed description of certain preferred embodiments thereof, taken in conjunction with the drawing wherein.

Figure 1:
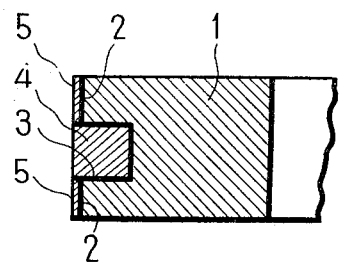
FIG. 1 shows a piston ring of the invention in fragmentary axial section.

Referring first to FIG. 1, there is shown a piston ring body 1 of cast iron or steel. The piston ring body has a cylindrical, peripheral sliding surface 2 and a centrally located annular groove 3 in the sliding surface. The groove carries a sintered sliding ring 4, and the sliding surface 2 is plated with a Co-W alloy 5.

The piston ring body may be made of any suitable cast iron or steel having the required hardness, tensile strength and modulus of elasticity required for the operating conditions of the internal combustion engine wherein the piston ring is to be used, as well known to those skilled in this art.

A useful tungsten-cobalt alloy for plating the sliding surface of the piston ring body may contain 60 percent W and 40 percent Co.

The sliding ring 4 may be usefully made from a mixture of iron oxide, carbon powder, and either polytetrafluoroethylene or waterglass as a bonding agent therefor, with a small amount of molybdenite, if desired. For instance, ferriferrous oxide ($Fe_3O_4$) of 100 mesh particle size has been found to be an effective iron oxide forming a major portion of the mixture, carbon powder of 150 mesh size being added as a minor component of the mixture. A small amount of molybdenite of 200 mesh particle size may be added, together with an effective amount of a bonding agent, such as polytetrafluoroethylene or waterglass.

For instance, I have used a mixture of 80 g $Fe_3O_4$, 17 g C, 3 g $MoS_2$, and 50 g $Na_2SiO_3$ for the sliding rings, and have sintered the mixture at a temperature of about 570°C.

In providing the electrodeposit 5 on the cast iron or steel piston ring body, the body is first immersed in a trichloroethylene bath, followed by vapor degreasing for about 10 minutes, as is conventional. The degreased body is then rinsed with water and subsequently subjected to liquid honing. For this purpose, the body is sprayed under a pressure of 6 kg/sq.cm. from a distance of 30 to 50 mm with an aqueous abrading liquid containing 100 parts of water and 10 parts of abrasive particles having a mesh size of 200 to 220. After honing, the body is again rinsed with water, and it is then plated.

The plating bath may comprise a cobalt salt, such as cobalt sulfate ($CoSO_4$) or cobalt chloride ($CoCl_2$) in an amount sufficient to provide about 3.5–5 g/l of cobalt, a tungsten salt, such as sodium tungstate ($Na_2WO_4$) or tungsten chloride, in an amount sufficient to provide about 3.0–5 g/l of tungsten, about 30–60 g/l of ammonia or ammonium chloride ($NH_4Cl$), and a water soluble electrolyte, such as sodium citrate ($Na_3C_6H_5O_7 \cdot H_2O$).

The bath temperature is kept between about 50°C and 85°C and at a pH of about 7.0 to 9.0. The current density is between 1 and 10 $A/dm^2$, the plating speed is about 0.15 micron/minute, and the anode is platinum or a Co-W alloy.

The thickness of the deposit 5 is preferably between 0.08 mm and 0.01 mm.

In a specific example, I have used an aqueous plating bath containing 60 g/l of $Na_2WO_4 \cdot 2H_2O$, 20 g/l of $CoSO_4 \cdot 7H_2O$, 50 g/l of $NH_4Cl$, and 60 g/l of Sodium citrate ($Na_3C_6H_5O_7 \cdot H_2O$)

The pH of the bath was adjusted to 8.4 by the addition of $NH_4OH$ and the bath temperature was kept at 80°C. The current density was 3 $A/dm^2$ and the plating was discontinued when the plating had reached a thickness of 0.01 mm. The anode was a Co-W alloy.

For purposes of comparison, a piston ring body provided with a chromium-plated sliding surface and a sintered sliding ring of the above-indicated type was compared with an otherwise identical piston ring having the same sintered sliding ring but a sliding surface plated with a Co-W alloy according to the above example.

Figure 2:
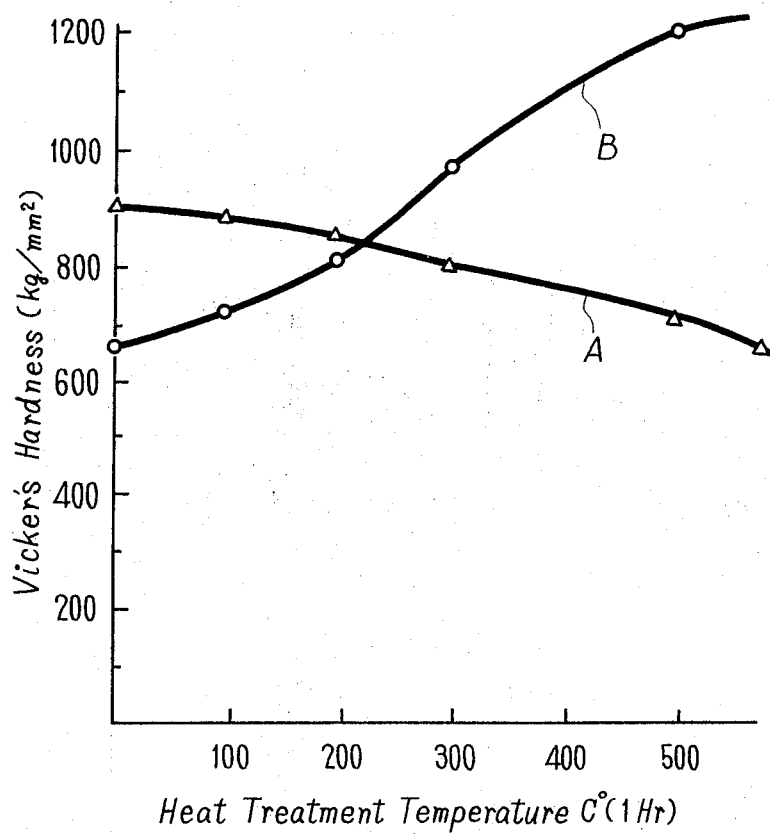
FIG. 2 is a graph illustrating the changes in hardness of surface coating on a piston of the type shown in FIG. 1 under various temperature conditions.
Figure 3:
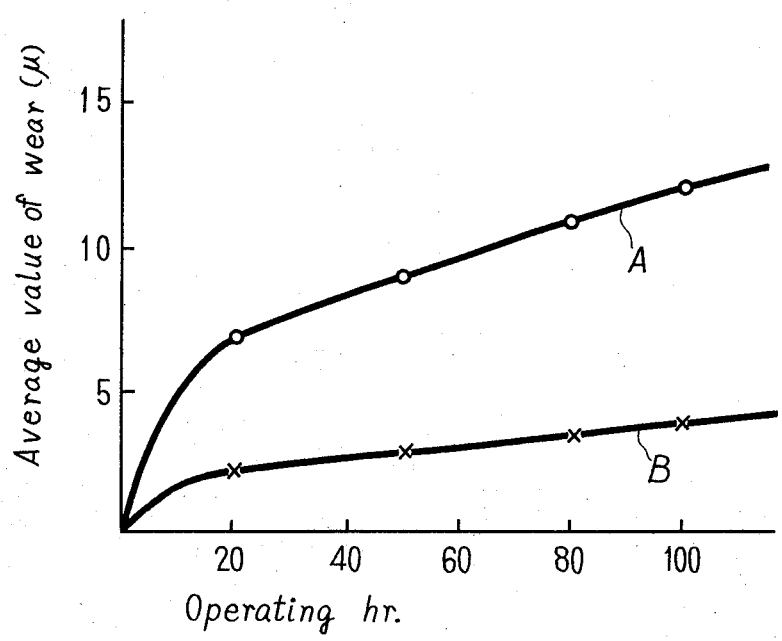
FIG. 3 is a graph illustrating a comparison between the wear and scuffing of piston rings with chromium-plated sliding surfaces and with W-Co alloy-plated sliding surfaces.

FIGS. 2 and 3 show curves indicating, respectively, the changes in the hardness of the plated sliding surfaces when held for 1 hour at temperature of 100°–500°C, and the wear and scuffing of the respective plated surfaces under identical conditions in a test engine.

Referring first to FIG. 2, curve A relates to the chromium plating while curve B reflects the hardness of the Co-W alloy plate. It will be noted that the Vickers hardness of the chromium plate falls below 650 at a temperature of about 570°C., which is the sintering temperature required for the sliding ring mixture. For purposes of providing an effective piston ring of long operating life, the sliding surface should have a minimum Vickers hardness of 700. As will be seen from curve B, the Vickers hardness of the Co-W alloy plate increases steadily as the temperature is raised, rising to about 1,200 at the sintering temperature.

FIG. 3 shows the wear and scuffing of the chromium-plated ring (curve A) and the Co-W alloy-plated ring (curve B), the abrasion resistance of the latter being visibly superior to that of the chromium-plated ring. Thus, the piston rings of the present invention have a longer life without sacrificing their improved gliding characteristics due to the sintered sliding ring.

What is claimed is:

1. A process of making a piston ring which comprises:
    a. depositing on the peripheral sliding surface of a piston ring body a coating of a tungsten-cobalt alloy, the sliding being formed with an annular groove;
    b. thereafter filling said groove with a mixture of iron oxide powder, carbon powder, and a bonding agent for said powders; and
    c. sintering said mixture in said groove until it is converted to a coherent ring.

2. A process as set forth in claim 1, wherein said alloy coating is deposited electrolytically from an aqueous plating bath including a cobalt salt, a tungsten salt, and a water soluble electrolyte, the pH of the bath being between about 7.0 and 9.0, and the bath temperature being between about 50°C. and 85°C.

3. A process as set forth in claim 2, wherein said cobalt salt is cobalt sulfate or cobalt chloride, and said tungsten salt is sodium tungstate or tungsten chloride.

* * * * *